Nov. 16, 1943.　　　M. H. QUICKEL　　　2,334,286
AIRCRAFT
Filed Jan. 8, 1941　　　3 Sheets-Sheet 1
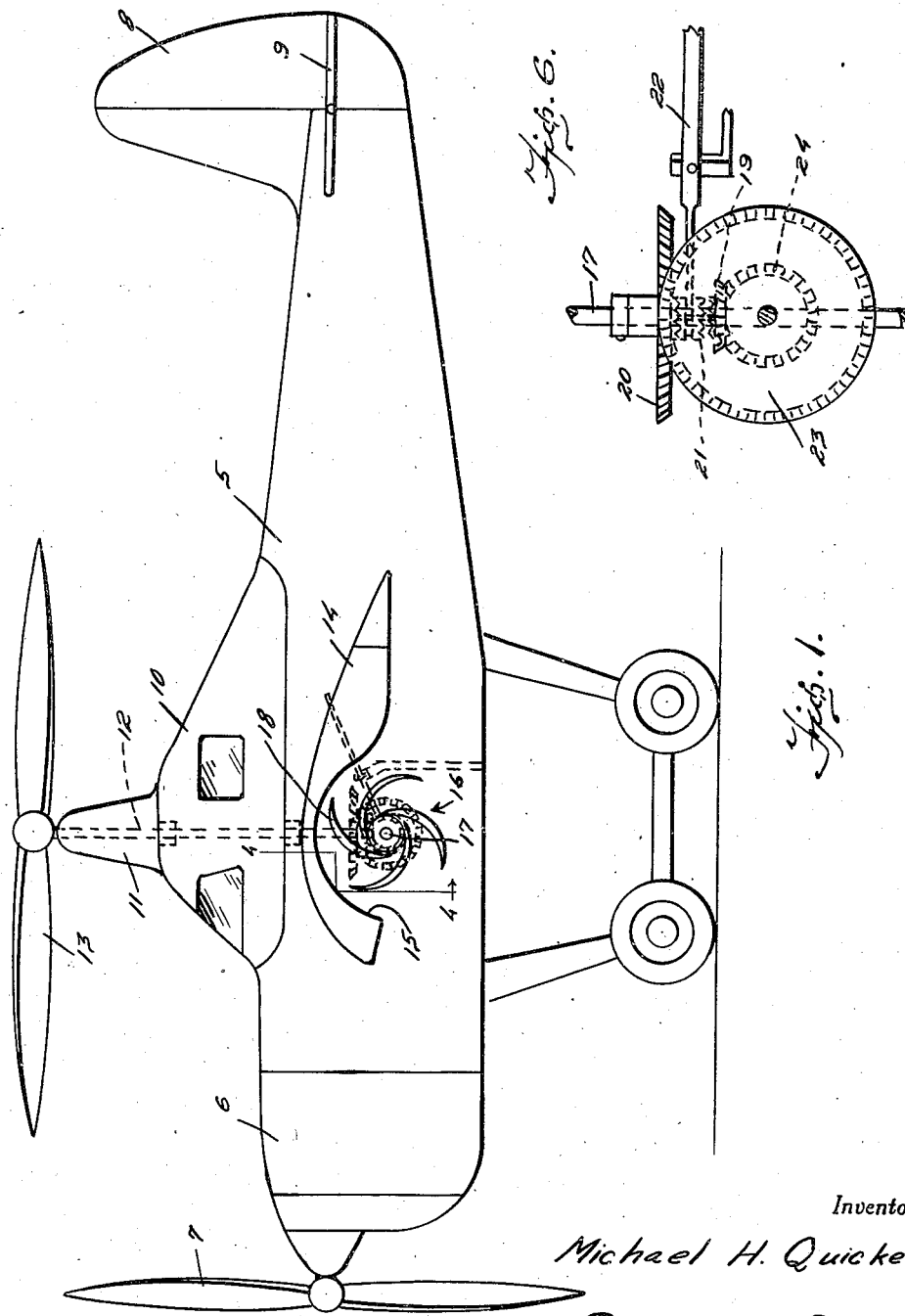
Inventor
Michael H. Quickel
By Clarence A. O'Brien
Attorney

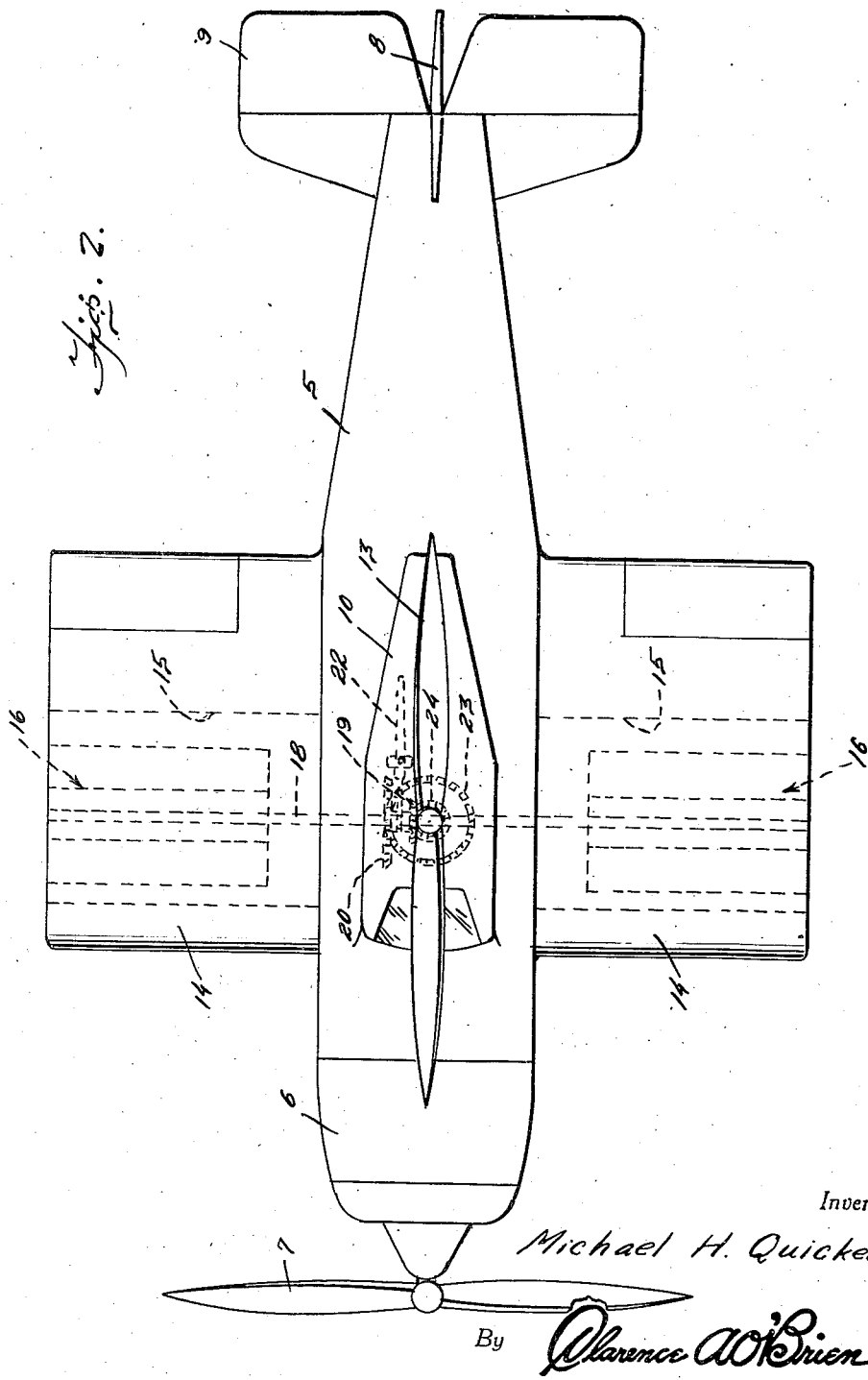

Nov. 16, 1943.         M. H. QUICKEL         2,334,286
                         AIRCRAFT
Filed Jan. 8, 1941                       3 Sheets-Sheet 3
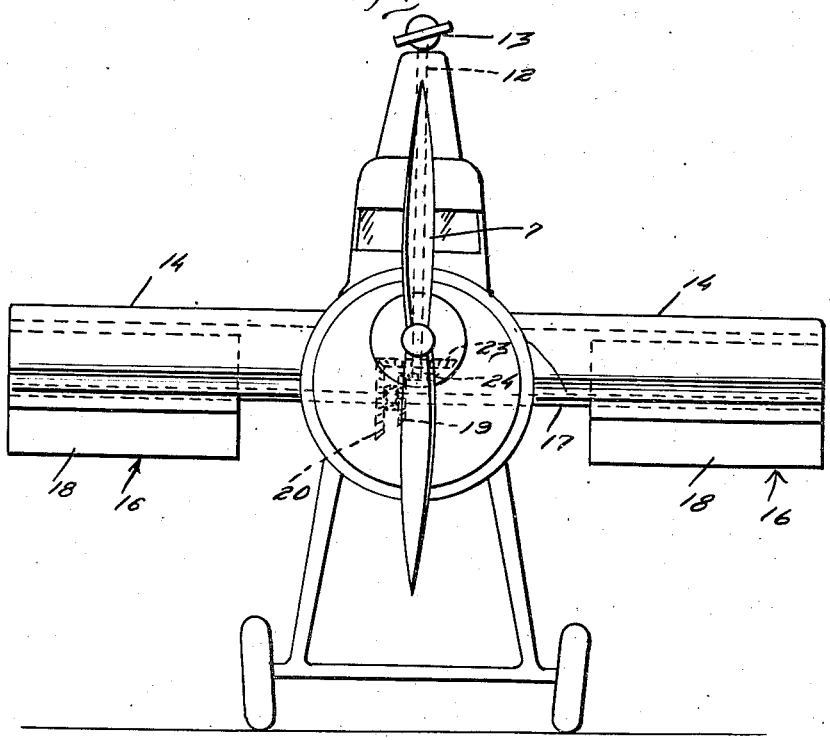
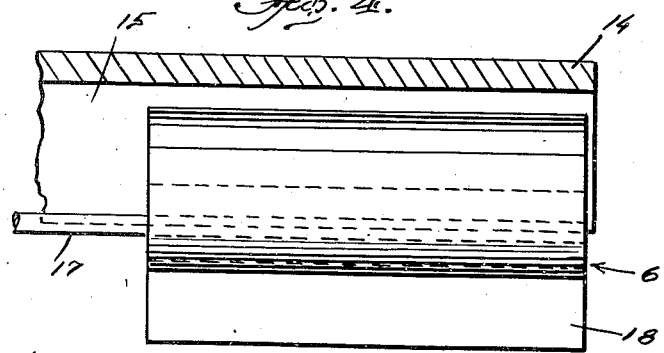
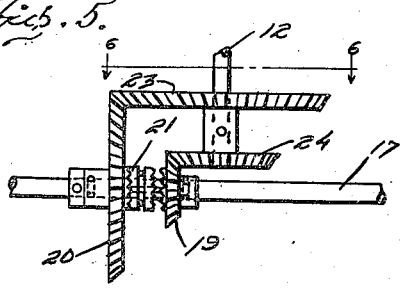
Inventor
Michael H. Quickel
By Clarence A. O'Brien
Attorney Patented Nov. 16, 1943

2,334,286

UNITED STATES PATENT OFFICE 2,334,286

AIRCRAFT

Michael H. Quickel, Utica, Ill.

Application January 8, 1941, Serial No. 373,669

1 Claim. (Cl. 244—6)

This invention relates to new and useful improvements in aircraft and more particularly to an aircraft which employs rotary elements built into wings for sustaining flight.

Another important object of the invention is to provide an aeroplane wherein the wings are provided with rotary elements which in operation serve to promote equilibrium and permit landing and taking off at lower speed.

Other objects and advantages of the invention will become apparent to the reader of the following specification.

In the drawings:

Figure 1 represents a side elevational view of the aircraft.

Figure 2 is a top plan view.

Figure 3 is a front elevational view.

Figure 4 is a fragmentary detailed sectional view taken substantially on line 4—4 of Figure 1.

Figure 5 is a fragmentary side elevational view of the gear means.

Figure 6 is a sectional view taken substantially on line 6—6 of Figure 5.

Referring to the drawings wherein like numerals designate like parts, it can be seen that the numeral 5 generally refers to the fuselage of the aircraft, the motor 6 of the aircraft being located at the forward end of the fuselage and in driving relation with a propeller 7. At the rear end of the fuselage 5 is a rudder 8 and elevators 9.

A windowed turret-like structure 10 is provided at the top of the fuselage 5 for the occupants of the aircraft and from the top of this turret 10 extends a riser 11.

A shaft 12 extends vertically through the turret 10 and riser 11 and is equipped with a propeller 13 at its upper end.

The fuselage 5 is provided with laterally disposed stubby wings 14, 14 each of which has a longitudinally extending recess 15 in the bottom thereof for partly receiving the corresponding rotor 16.

Each of these rotors 16 consists of a shaft 17 having a suitable hub structure thereon and a plurality of blades 18 which are transversely curved and extend eccentrically with respect to the shaft 17. These blades are operative through the recess 15 in the corresponding wing 14 for substantially one-half of their full rotation.

The shaft 17 can be common to both rotors 16, extending entirely through the fuselage 5 and at a point within the fuselage is provided with freely rotatable bevel gears 19 and 20, the bevel gear 19 being substantially smaller than the gear 20. A toothed clutch collar 21 is splined to the shaft 17 and the opposed sides of the gears 19 and 20 are provided with teeth with one or the other of which the toothed clutch member 21 is engageable. A suitable control lever 22 is provided for the clutch collar 21.

The large bevel gear 20 meshes with a large bevel gear 23 on the vertical shaft 12, while the small bevel gear 19 meshes with a correspondingly small bevel gear 24 on the lower end of the vertical shaft 12.

It can now be seen that the operator of the aircraft by actuating the lever 22 can cause the shaft 17 to drive the shaft 12 either through the gears 19, 24 or the gears 20, 23. At this point it will also be understood that the rotors 16 start to rotate as the aircraft moves along the ground in its takeoff and as these rotors 16 rotate, they rotate the propeller 13 to effect some lifting power while the blades 18 of the rotors 16 build up an air pressure under the stub wings 14.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

An aircraft comprising a body, a propeller for pulling the body forwardly, a horizontal propeller at the top of the body for lifting the same, wings extending laterally from the body and each wing having a longitudinally extending recess opening out at its lower face, said recess being of arcuate shape in cross section, a bladed air motor having its upper portion located in each recess and adapted to build up air pressure in the recess upon rotation of the air motor by the forward momentum of the body, said air pressure thus developed exerting an uplifting action on the underside of the wing, shafting for connecting the air motors with the body, a vertical shaft extending from the second-named propeller into the body, and gearing connecting the shafting for the air motors with the vertical shaft.

MICHAEL H. QUICKEL.